C. G. STEPHENSON.
SPRING FRAME FOR MOTOR CYCLES.
APPLICATION FILED MAR. 10, 1911.
1,043,269.
Patented Nov. 5, 1912.
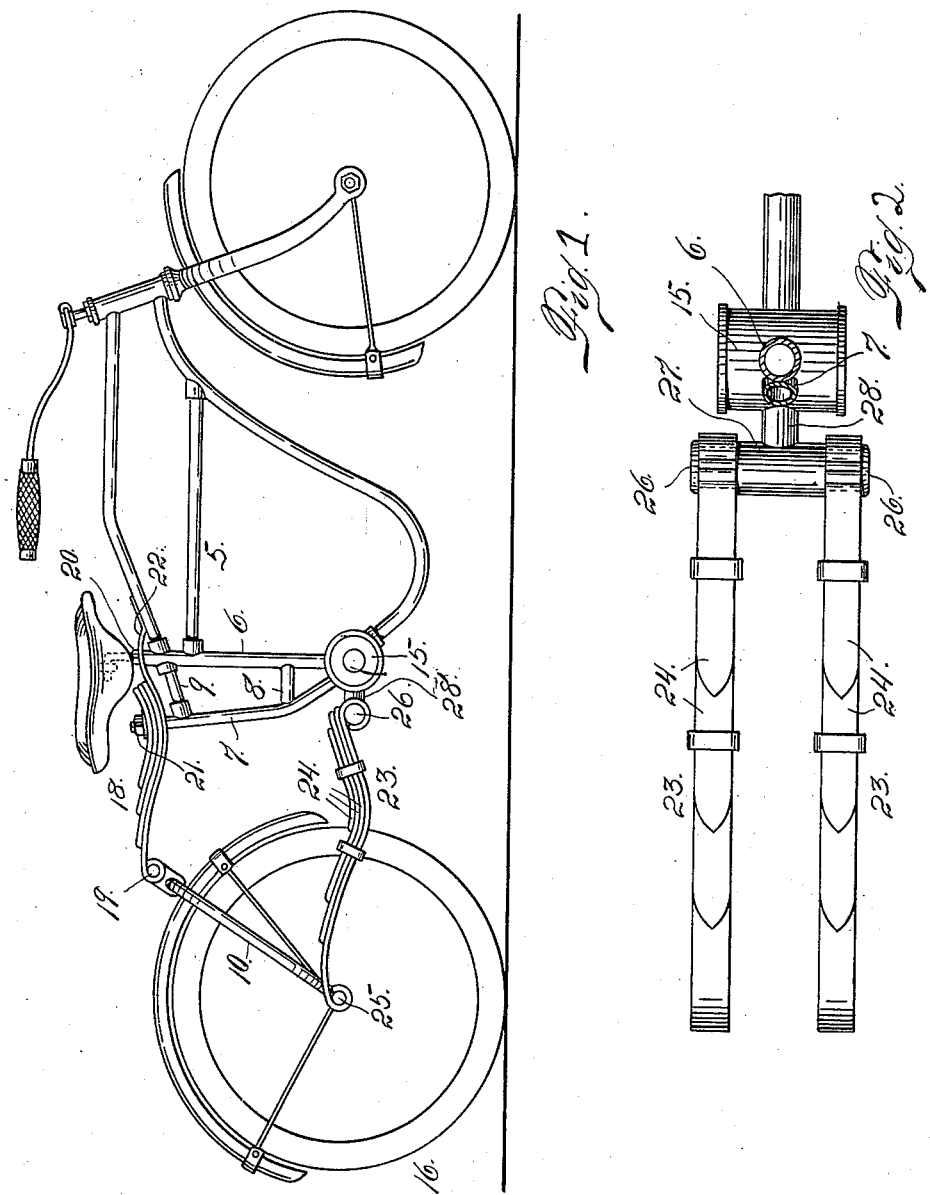

UNITED STATES PATENT OFFICE.

CHARLES G. STEPHENSON, OF DENVER, COLORADO.

SPRING-FRAME FOR MOTOR-CYCLES.

1,043,269.

Specification of Letters Patent.

Patented Nov. 5, 1912.

Application filed March 10, 1911. Serial No. 613,557.

*To all whom it may concern:*

Be it known that I, CHARLES G. STEPHENSON, a citizen of the United States, residing in the city and county of Denver and State of Colorado, have invented certain new and useful Improvements in Spring-Frames for Motor-Cycles; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in spring frames for motor cycles, my object being to relieve the rider from the annoying and injurious jar or vibration to which he is subjected while riding in a machine of this class.

It is well known that motor cycles have a capacity for very rapid traveling and that the riders usually run them at high speed. This results, where the frame is of ordinary construction, in subjecting the body to such jar or concussion as makes it physically impossible for many persons to ride these machines.

In my improved construction I have overcome the aforesaid difficulty by connecting the rear part of the framework and the central part thereof by means of a leaf spring or springs, preferably composed of a number of leaves or plates suitably connected together in operative relation.

In one form of my improved construction I employ a top spring connecting the rear upwardly projecting fork with a seat post, while in another form I employ an additional spring located below and connecting the rear axle with the central bearing, the last named spring being bifurcated whereby it extends on opposite sides of the rear wheel and forwardly therefrom, taking the place of the lower fork in the other form of construction. By employing this duplex spring arrangement, I obtain additional resilience and while either spring may be employed alone, the two springs are preferable where a particularly yielding and easy-riding construction is desired.

Having briefly outlined my improved construction, I will proceed to describe the same in detail, reference being made to the accompanying drawing in which is illustrated an embodiment thereof.

In this drawing: Figure 1 is a side elevation of a motor cycle equipped with my improvement. Fig. 2 is a plan view partly in section, illustrating the lower rear fork and the central portion of the framework.

The same reference characters indicate the same parts in all the views.

Referring first to the construction shown in the drawing, let the numeral 5 designate the framework of a motor cycle, including a seat post 6; a bar 7 connected with the seat post by relatively short members 8 and 9; and a rear upwardly projecting fork 10.

The rear fork 10 straddles the rear wheel 16 and its lower extremities are pivotally connected with the journals of the rear axle. To the upper extremity of this fork 10 is connected the rear extremity of a spring 18, this connection being designated by the numeral 19, the forward extremity of the spring being connected with the bars 6 and 7 as shown at 20 and 21 respectively. A single plate or member 22 of the spring is carried forwardly and connected with the seat post proper, while the body of the spring, which is composed of a series of plates or layers, is secured to the top of the auxiliary post 7. This spring taken in connection with the spring fork 23, gives a resilience to the frame which relieves the rider of the usual jar incident to the use of a machine of this character.

The lower rear fork is dispensed with and a spring fork 23 is substituted therefor, the same consisting of two members 24 passing on opposite sides of the rear wheel and suitably connected with the opposite extremities of the axle as shown at 25. The forward extremity of this spring is connected with laterally projecting members 26 forming a part of a T 27, the stem or central part 28 of the T extending forwardly and being rigidly connected with the bearing 15 of the crank shaft. This additional spring 23 as heretofore explained, gives additional resilience or yielding capacity to the framework of the machine, and by regulating the strength and resilient quality of these springs, all that is desired in a spring frame for a machine of this character may be attained.

In the drawing I have illustrated springs built up of a series of plates connected together in the same manner as the built-up members of the ordinary elliptical buggy spring. In my improved construction, however, the elliptical form or design is not present, but a single spring bar composed of members connected in laminated form is employed for the upper spring, while a pair of similar members constitutes the lower spring.

It is evident, however, that any suitable spring arranged as indicated in the drawing and heretofore described may be employed, the invention not being limited to the details of construction herein shown and described.

Having thus described my invention, what I claim is:

1. A motor cycle whose lower rear fork is composed of springs, each spring consisting of a number of plates connected in operative relation, the rear extremities of the springs being connected with the opposite ends of the rear axle, while the forward extremities are connected with the lower part of the frame forward of the wheel, substantially as described.

2. A motor cycle having an upper and a lower spring interposed between the central part of the framework and the rear fork and axle of the machine respectively, the upper spring being rigidly secured at its forward extremity to the top central part of the framework and the lower spring being connected at its forward extremity to the framework, substantially as described.

3. A motor cycle having upper and lower springs, each composed of a series of plates suitably connected, the forward extremity of the upper spring being rigidly connected with the central part of the framework, while the forward extremity of the lower spring is connected with the lower central part of the framework forward of the rear wheel, the rear extremity of the upper spring being connected with the forwardly projecting rear fork and the rear extremity of the lower spring with the opposite extremities of the rear axle, substantially as described.

In testimony whereof I affix my signature in presence of two witnesses.

CHARLES G. STEPHENSON.

Witnesses:
F. E. BOWEN,
HORTENSE UHLRICH.

Copies of this patent may be obtained for five cents each, by addressing the "Commissioner of Patents, Washington, D. C."